(12) United States Patent
Debanne et al.

(10) Patent No.: US 10,852,159 B2
(45) Date of Patent: Dec. 1, 2020

(54) METHOD FOR CONTROLLING THE PRECESSION OF A VIBRATING STRUCTURE GYROSCOPE

(71) Applicant: Safran Electronics & Defense, Boulogne-Billancourt (FR)

(72) Inventors: Pascal Debanne, Boulogne-Billancourt (FR); Arnaud Pinturaud, Boulogne-Billancourt (FR); Benjamin Deleaux, Boulogne-Billancourt (FR); Jean-Christophe Charlaix, Boulogne-Billancourt (FR)

(73) Assignee: SAFRAN ELECTRONICS AND DEFENSE, Boulogne-Billancourt (FR)

( * ) Notice: Subject to any disclaimer, the term of this patent is extended or adjusted under 35 U.S.C. 154(b) by 449 days.

(21) Appl. No.: 15/821,535

(22) Filed: Nov. 22, 2017

(65) Prior Publication Data

US 2018/0094947 A1   Apr. 5, 2018

Related U.S. Application Data

(63) Continuation-in-part of application No. PCT/EP2016/061881, filed on May 26, 2016.

(30) Foreign Application Priority Data

May 26, 2015   (FR) ...................... 15 01083

(51) Int. Cl.
*G01C 25/00* (2006.01)
*G01C 19/567* (2012.01)
*G01C 19/5776* (2012.01)
*G01C 19/56* (2012.01)

(52) U.S. Cl.
CPC .......... *G01C 25/005* (2013.01); *G01C 19/56* (2013.01); *G01C 19/567* (2013.01); *G01C 19/5776* (2013.01)

(58) Field of Classification Search
CPC .... G01C 25/005; G01C 19/56; G01C 19/567; G01C 19/5776
See application file for complete search history.

(56) References Cited

U.S. PATENT DOCUMENTS

2010/0095771 A1*  4/2010  Lignon ............... G01C 19/56
                                                      73/504.12
2011/0259078 A1* 10/2011  Caron ................ G01C 19/56
                                                      73/1.77

(Continued)

FOREIGN PATENT DOCUMENTS

FR         27755227 A1    4/1998
FR          2937414 A1    4/2010

(Continued)

OTHER PUBLICATIONS

Preliminary Research Report and Written Opinion received for French Application No. 1501083, dated Mar. 15, 2016, 12 pages (1 page of French Translation Cover Sheet and 11 pages of original document).

(Continued)

*Primary Examiner* — Michael J Dalbo
(74) *Attorney, Agent, or Firm* — Womble Bond Dickinson (US) LLP (57) ABSTRACT

A method is proposed for controlling the precession of a gyroscope (1) comprising a support (2) and a resonator (3), the support (2) being mobile in a platform coordinate system and stationary in a measurement coordinate system, the method comprising the generation (101) of a first control signal suitable for rotating the resonator (3) with respect to the support (2) in two opposite directions of rotation during a first period, the method being characterized by the following steps:

reception (104) of data (Tpm) on relative positioning between the measurement coordinate system and the platform coordinate system, (Continued)

calculation (105) of a second control signal to be generated during a second period on the basis of the first control signal and the relative-positioning data, the second control signal being chosen in such a way as to minimize an average of accumulated angular errors in the angular measurements acquired by the gyroscope during the entirety of the first and second period, the angular errors being expressed in the platform coordinate system.

12 Claims, 4 Drawing Sheets

(56) References Cited

U.S. PATENT DOCUMENTS

2013/0332105 A1* 12/2013 McKown ................ G01P 21/00
702/141

2015/0344271 A1* 12/2015 Schneider ............... B66C 13/08
212/273

FOREIGN PATENT DOCUMENTS

| FR | 2939192 A1 | 6/2010 |
| GB | 2319085 A | 5/1998 |
| WO | 2011/128605 A2 | 10/2011 |

OTHER PUBLICATIONS

International Search Report received for PCT Patent Application No. PCT/EP2016/061881, dated Aug. 23, 2016, 8 pages (3 pages of English Translation and 5 pages of Original Document).
International Preliminary Report on Patentability received for PCT Patent Application No. PCT/EP2016/061881, dated Sep. 6, 2017, 51 pages (16 pages of English Translation and 35 pages of Original Document).

* cited by examiner

METHOD FOR CONTROLLING THE PRECESSION OF A VIBRATING STRUCTURE GYROSCOPE

GENERAL FIELD

The invention relates to the field of devices of angular measurements.

The invention relates more specifically to a method for controlling a vibrating structure gyroscope and a device for implementing this method.

PRIOR ART

A gyroscope is a device suitable for acquiring angular measurements (for examples angular positions or angular speeds).

A particular type of gyroscope, called "vibrating structure gyroscope," comprises a support and a resonator mobile with respect to the support. The resonator is configured to vibrate in a given plane, called plane of vibration.

Figure 1:
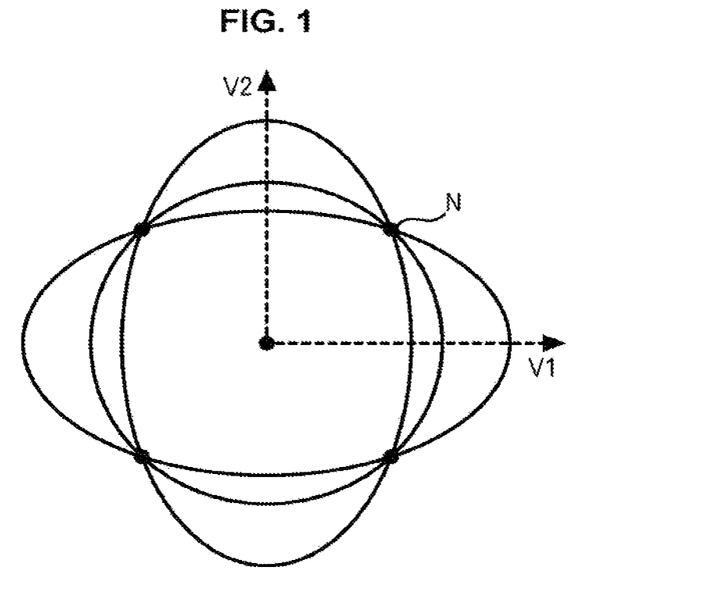
FIG. 1, already discussed, shows the plane of vibration of a vibrating structure gyroscope.

The plane of vibration of a vibrating structure gyroscope is illustrated in FIG. 1.

The resonator of this gyroscope vibrates in two directions V1 and V2 that define the plane of vibration. In other words, the resonator is suitable for contracting and stretching in the direction V1 and in the direction V2 perpendicular to V1.

The vibration of the gyroscope has nodes and anti-nodes. One of the nodes of this vibration is labeled N in FIG. 1.

If the support of this gyroscope (that is assumed to be rigidly connected to the case of this same gyroscope) rotates about an axis normal to the plane of vibration (and thus of FIG. 1), the directions of vibrations V1 and V2 also undergo rotation about this axis under the effect of the Coriolis forces. The vibration node N shown in FIG. 1 is therefore at an angle at a time t with respect to the support, called electrical angle.

The electrical angle is proportional to the rotation the case and the support of the gyroscope undergo, with a constant ratio less than or equal to 1, according to the type of resonator.

Because of this constant ratio, and the use of sensors of the electrical angle, the gyroscope can deduce the angle of rotation to which its case has been subjected.

However, the measurement of electrical angle can be riddled with errors transmitted to the estimated angle of rotation of the case of the gyroscope.

To avoid such errors, document FR 2 937 414 A1 proposes giving the resonator a movement of precession via a control signal. During a given period, the control signal varies the electrical angle over 180 degrees in a given direction, then over 180 degrees in the opposite direction, in such a way as to cancel out the average of the errors in electrical angle in the measurement coordinate system of the rate gyro. This movement of precession is conventionally called alternating movement of precession.

Vibrating structure gyroscopes are moreover conventionally used in inertial measurement units on board a carrier such as an aircraft or a ship, this carrier being mobile in a predetermined geographic coordinate system.

The inertial measurement unit integrates angular measurements acquired by these vibrating rate gyros in such a way as to estimate a navigation solution of the carrier in the geographic coordinate system.

The coordinate system in which the location calculations are implemented by the measurement unit is a coordinate system called platform coordinate system that is different from the measurement coordinate system of the rate gyro. The platform coordinate system can be, for example, the geographic coordinate system or a coordinate system neighboring this geographic coordinate system.

However, if the alternating precession technique allows the average of the errors in the measurement coordinate system (coordinate system of the support of the gyroscope) to be cancelled out, this technique does not allow the effect of these errors in the platform coordinate system to be cancelled out. This leads to a degradation of the estimated navigation solution when the carrier carries out angular movements in the platform coordinate system.

DISCLOSURE OF THE INVENTION

One goal of the invention is to reduce the impact of measurement errors induced by a vibrating structure gyroscope on navigation data produced by an inertial measurement unit.

In order to reach this goal, the invention proposes a method for controlling the precession of a gyroscope comprising a support and a resonator, the support being mobile in a platform coordinate system and stationary in a measurement coordinate system, the method comprising the generation of a first control signal suitable for rotating a vibration of the resonator with respect to the support in two opposite directions of rotation during a first period, the method being characterized by the following steps:

reception of data on relative positioning between the measurement coordinate system and the platform coordinate system, calculation of a second control signal to be generated during a second period on the basis of the first control signal and the positioning data, the second control signal being chosen in such a way as to minimize an average of accumulated angular errors in the angular measurements acquired by the gyroscope during the entirety of the first and second period, the angular errors being expressed in the platform coordinate system.

In the context of the proposed method, the second control signal dynamically corrects the first signal on the basis of a criterion of error minimization not expressed in the measurement coordinate system, but in the platform coordinate system. The reformulation of this minimization criterion in another coordinate system and the provision of the data on relative positioning between the two coordinate systems in question allow the gyroscope to be controlled in such a way as to correct errors in the angular measurements provided by the gyroscope that are relatively insignificant in the measurement coordinate system but become much more detrimental in data expressed in the platform coordinate system and obtained after processing that involves a change in coordinate system from the measurement coordinate system to the platform coordinate system.

The method according to the invention can also be completed by the following features, taken alone or in any one of the technically possible combinations thereof.

The data on relative positioning during the first period can be calculated by an inertial measurement unit using angular measurements previously provided by the vibrating structure gyroscope(s).

The calculation of the second control signal can comprise the calculation of two times of change in direction of rotation during the second period.

The two times of change in direction of rotation can thus be calculated using an interior point method.

The second control signal can be a rectangular precession signal.

The first period and the second period can have identical durations.

The relative-positioning data can comprise a matrix for transition from the measurement coordinate system to the platform coordinate system.

Since the relative-positioning data is calculated at a reference time, the second precession signal can be calculated under the hypothesis that the relative-positioning data is fixed from the reference time throughout the entire second period.

The method can also comprise the calculation of at least one first correction coefficient representative of a scale-factor error that occurred in the first period, on the basis of the first control signal and the relative-positioning data, the second control signal being dependent on the first correction coefficient.

The method can further comprise the calculation of at least one second correction coefficient representative of a harmonic drift of the second order, the second control signal being dependent on the second correction coefficient.

According to a second aspect, the invention proposes a device for controlling precession for a vibrating structure gyroscope comprising a support mobile in a platform coordinate system and stationary in a measurement coordinate system, and a resonator suitable for vibrating with respect to the support, the control device comprising:
 a generator configured to generate a first control signal suitable for rotating a vibration of the resonator with respect to the support in
two opposite directions of rotation during a first period, the control device being characterized by:
 an input for receiving data on relative positioning between the measurement coordinate system and the platform coordinate system,
 a calculation unit configured to calculate, on the basis of the first control signal generated by the generator and the positioning data received via the input, a second control signal to be generated during a second period, the second control signal being chosen in such a way as to minimize an average of accumulated angular errors in angular measurements acquired by the gyroscope during the entirety of the first and second period, the angular errors being expressed in the platform coordinate system.

According to a third aspect, the invention proposes a vibrating structure gyroscope comprising a support, a resonator, a vibration of which can be rotated with respect to the support, and a control device according to the second aspect of the invention.

According to a fourth aspect, the invention also proposes a system comprising at least one vibrating structure gyroscope according to the third aspect of the invention, and an inertial measurement unit comprising a unit for processing data, configured to produce the relative-positioning data from angular measurements provided by the vibrating structure gyroscope.

According to a fifth aspect, the invention relates to a computer program product comprising program-code instructions for executing the steps of the method according to the first aspect of the invention, when this program is executed by a control device.

DESCRIPTION OF THE DRAWINGS

Other features, goals and advantages of the invention will be clear from the following description, which is purely illustrative and non-limiting, and which must be read in comparison to the appended drawings in which.

In all of the drawings, similar elements have the same reference signs.

DETAILED DESCRIPTION OF THE INVENTION

Figure 2:
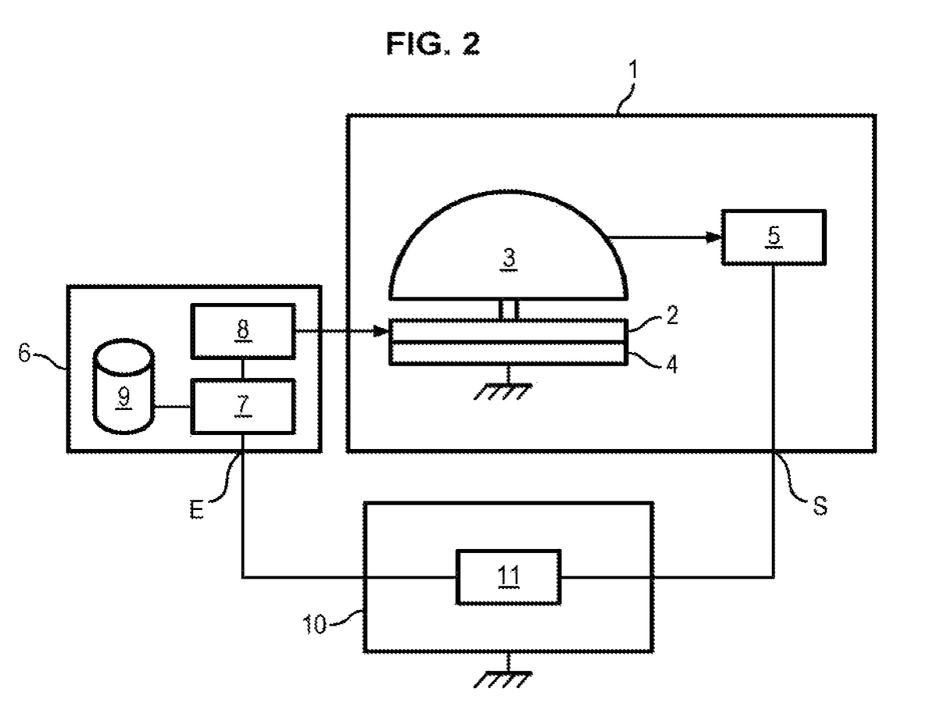
FIG. 2 schematically shows a vibrating structure gyroscope in association with an inertial measurement unit, according to an embodiment of the invention.

In reference to FIG. 2, a vibrating structure gyroscope 1 comprises a support 2 and a resonator 3.

The resonator is fastened onto the support, but is capable of vibrating with respect to the support 2 in the way described in relation to FIG. 1.

The resonator 3 can, for example, have a hemispherical shape, in which case it is called a hemispherical resonator gyroscope (abbreviated as HRG). The resonator 3 is suitable for vibrating in a plane of vibration corresponding to the plane shown in FIG. 1 and described in the introduction.

The gyroscope also comprises a case 4 linked to a measurement reference frame defined by a measurement coordinate system. The case 4 houses the support 2 and the resonator 3. The case 4 comprises an output S.

The vibrating structure gyroscope also comprises at least one vibration sensor 5 housed in the case 4, for example a plurality of sensors distributed about an axis normal to the plane of vibration of the resonator. The sensor 5 is suitable for measuring an electrical angle formed by the resonator 3 with respect to the support 2 and delivering, on an output S, angular measurements (for example angular positions or angular speeds) deduced from the electrical measurements of angle.

The support 2 and the sensor 5 are rigidly connected to the case 4.

The vibrating structure gyroscope 1 is connected to a control device 6 comprising an input E, a calculation unit 7 and a generator 8 of signals for controlling the precession of the gyroscope 1.

The calculation unit 7 is or comprises at least one processor.

The calculation unit 7 is connected to the input E and is configured to calculate a control rule.

The generator 8 of commands is connected to the calculation unit 7. This generator 8 is configured to generate a signal for controlling precession over a given period of time, on the basis of a control rule established by the calculation unit 7.

The control device 6 also comprises a buffer memory 9, to which the calculation unit 7 has reading and writing access.

FIG. 2 also illustrates an inertial measurement unit 10 comprising a unit 11 for processing data. FIG. 2 shows the vibrating structure gyroscope 1, the control device 6 and the inertial measurement unit 10 as distinct devices; the gyroscope and the control device could also be one, forming an integral part of the inertial measurement unit 10. However, in a non-illustrated alternative, the devices 7 and 11 can be combined.

The inertial measurement unit can also comprise (or be coupled to) other inertial sensors, for example at least one accelerometer.

The processing unit 11 of the inertial measurement unit 10 is connected to an output S of the vibrating structure gyroscope 1 and to the control device 6.

The processing unit 11 comprises, for example, at least one processor.

The inertial measurement unit 10 and the gyroscope 1 are typically on board a carrier (not illustrated), such as an aircraft or a ship.

The carrier is mobile in a predetermined geographic reference frame. This geographic reference frame is defined by a geographic coordinate system comprising for example: an origin O centered on a predetermined point of the body of the carrier, and an axis x pointing towards the North Pole, an axis y pointing west, and an axis z pointing towards the sky in such a way that the coordinate system (O, x, y, z) is direct orthonormal.

The inertial unit is configured to implement location calculations in an arbitrary coordinate system, called platform coordinate system, the orientation of which with respect to the geographic coordinate system is known and with a small range of variation in comparison to the range of the movements of the carrier in the geographic coordinate system. This platform coordinate system, maybe for example the geographic coordinate system.

The origin of the measurement coordinate system can be the same as that of the platform coordinate system. In this case, the three axes of the measurement coordinate system are simply mobile in rotation with respect to the three axes of the platform coordinate system when the carrier is moving.

Hereinafter, it is assumed that the case 4 of the gyroscope 1 is stationary with respect to the inertial measurement unit, and that they are consequently linked to the same measurement coordinate system, which is attached to the structure of the carrier (this rigidly connected nature is illustrated in FIG. 2 by an attachment of the inertial measurement unit 10 and of the case 4 to the same frame).

The processing unit 11 of the inertial measurement unit 10 is configured to receive measurements expressed in the measurement coordinate system, coming from at least one vibrating structure gyroscope 1, and more precisely from its vibration sensor 5. Inertial sensors other than the vibrating structure gyroscope 1 can also be connected to the unit 11, for example accelerometers (not illustrated), in order to provide this unit 11 with corresponding inertial measurements.

In a manner known per se, the processing unit 11 of the inertial measurement unit is configured to establish a navigation solution in the platform coordinate system on the basis of received measurements, expressed in the measurement coordinate system. The processing unit 11 combines the measurements received from the inertial sensors with a kinematic model of the carrier, in such a way as to produce the navigation solution.

The processing unit 11 of the inertial measurement unit 10 is also suitable for calculating data on relative positioning between the platform coordinate system and the measurement coordinate system, on the basis of the measurements provided by the inertial sensor(s) and/or the navigation solution.

Method for Controlling a Vibrating Structure Gyroscope

Figure 3:
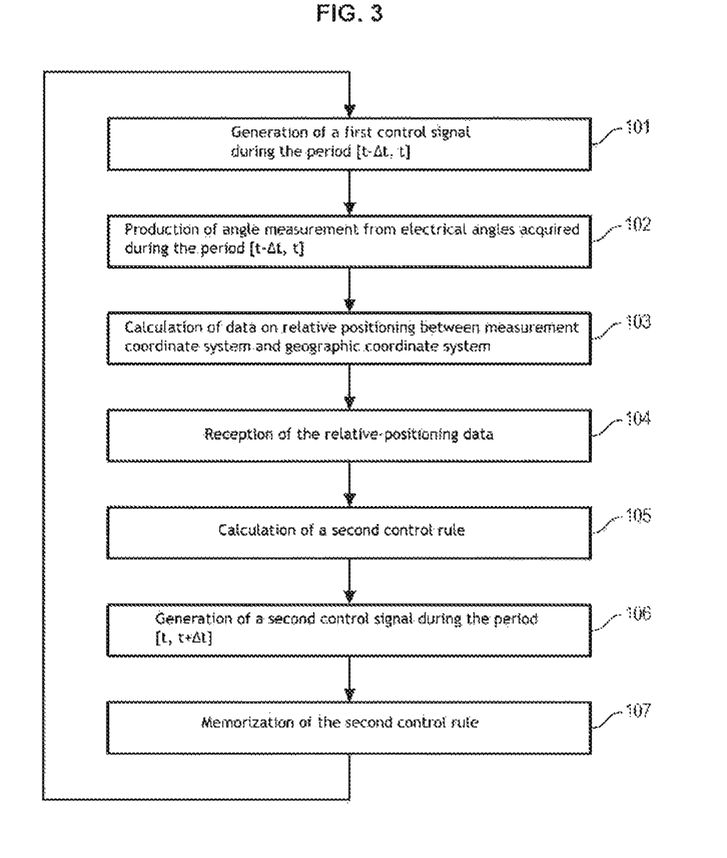
FIG. 3 is a flow chart of steps of a control method according to an embodiment of the invention.

A control method implemented by the control device 6 in order to control the precession of the plane of vibration of the resonator 3 of the vibrating structure gyroscope 1 will now be described in reference to the flow chart illustrated in FIG. 3.

It is initially assumed that data representative of a first control rule having a duration $\Delta T1$ has been previously memorized in the buffer memory 9.

The generator 8 generates a first control signal according to the first control rule memorized, during a first period having a duration $\Delta T1$ (step 101). During the first period, this first control signal rotates a vibration of the resonator 3 in two opposite directions of rotation. In other words, the nodes and anti-nodes of the vibration of the resonator move about an axis of the resonator, under the effect of this first control signal.

By convention, the first period is considered to correspond to the time interval $[t-\Delta T1, t]$, where t is a reference time.

During the first period of time $[t-\Delta T1, t]$, the sensor 5 measures the electrical angle of the resonator 3 with respect to the support 2. The sensor 5 delivers, on the output S of the gyroscope, at least one angular measurement in the measurement coordinate system (step 102).

The inertial measurement unit 10 thus receives angular measurements provided by the gyroscope 1 during the first period $[t-\Delta T1, t]$.

The processing unit 11 of the inertial measurement unit 10 calculates a navigation solution in the platform coordinate system on the basis of the angular measurements provided by the vibrating structure gyroscope 1, or even measurements provided by other inertial sensors. This calculation typically comprises an integration of the angular measurements provided by the vibrating structure gyroscope 1.

The processing unit 11 of the inertial measurement unit also calculates data on relative positioning between the platform coordinate system and the measurement coordinate system using the inertial measurements (step 103). For example, this relative-positioning data comprises a matrix Tpm for transition between the measurement coordinate system and the platform coordinate system. The calculation of this positioning data is well known in the field of inertial measurement units.

The data on relative positioning between the platform coordinate system and the measurement coordinate system is received by the calculation unit 7 of the control device 6, via the input E of the control device 6 (step 104).

The calculation unit 7 of the control device 6 then calculates a second control rule for generating a second control signal during a second period of time to come (step 105).

The second control rule is calculated on the basis of the first rule, memorized by the buffer memory 9 as well as the relative-positioning data Tpm received.

The second control rule is calculated over a period having a duration $\Delta T2$, which can be chosen, for example, to be equal to $\Delta T1$ in order to simplify an iterative implementation of the method.

The second period is chosen as being a horizon $[t, t+\Delta T2]$, in order for the resonator 3 to be controlled continuously. Here, the reference time t thus designates a time at which the second control signal begins to be generated by the generator 8.

In a non-conventional way different from the method of precession proposed in document FR2937414 A1, the second control rule (on the basis of which the second control signal is generated) is chosen at the reference time t in such a way as to minimize accumulated angular errors in the angular measurements acquired by the gyroscope during a time interval [t−ΔT1, t+ΔT2], these angular errors being expressed in the platform coordinate system. This interval covers the first period [t−ΔT1, t], (over), during which the first signal for controlling precession was generated, and a second period [t, t+ΔT2] (to come), during which the second control signal will be generated.

The minimization of the angular errors can typically be carried out under the hypothesis that the parameters of errors of the sensor are constant over the period [t−ΔT1, t+ΔT2]. Indeed, these parameters are unknown, but their effects on the angular error can be predicted via a model over the first and second period: during the first, the effects are observed, during the second, a command is generated in such a way the angular error over the two periods is minimized.

Since no angular measurement during this second period to come is yet available, the angular measurements of this second period are estimated by the calculation unit 7 in order to produce the second control rule.

The generator 8 then effectively generates the second control signal during the second period [t, t+ΔT2] on the basis of the second control rule calculated by the calculation unit 7 (step 106). Just like the first control signal, the second control signal is suitable for rotating the vibration of the resonator 3 in two opposite directions.

Data representative of the second control rule is then memorized in the buffer memory 9 (step 107).

The aforementioned steps are repeated in successive iterations, each iteration having its own reference time, and with regard to two control rules:
  a control rule memorized in the buffer memory 9 and produced in a previous iteration (the first control rule), and
  another control rule calculated during the current cycle by the calculation unit 7 on the basis of:
    the control rule applied over the first period and memorized, and
    relative-positioning data received from the inertial measurement unit during the first period.

The reference times of the iterations of the method are, for example, chosen as having the form t+kΔT, with k being an integer, in order to produce a continuous signal for controlling precession.

The steps implemented by the elements of the control device (in particular the calculation unit 7 and the generator 8) can be executed via a computer program product comprising program-code instructions. The calculation unit 7 and the generator 8 are thus configured to implement such a computer program product.

Embodiment with Three Gyroscopes

In a specific embodiment that is not at all limiting, three hemispherical resonator gyroscopes operating in parallel are connected to the control device 6 and to the inertial measurement unit 10. Each gyroscope is dedicated to angular measurement with regard to a respective axis of the measurement coordinate system, and each accelerometer is dedicated to the measurement of acceleration along a respective axis of the measurement coordinate system.

Figure 4:
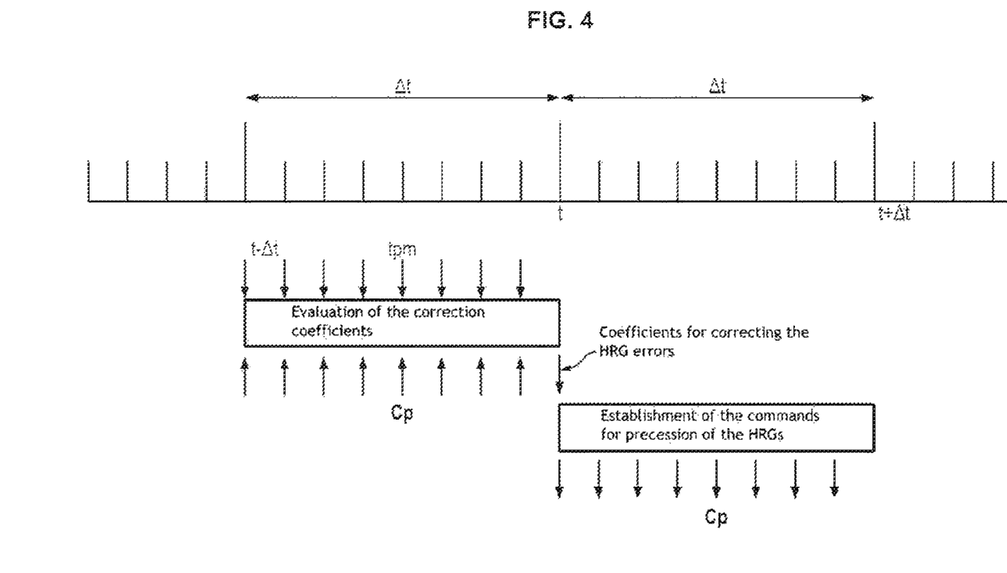
FIG. 4 is a temporal diagram defining two periods of time during which the steps of the method of FIG. 3 are implemented.

In reference to FIG. 4, in this embodiment, the step 105 of calculating the second rule comprises the calculation of a plurality of correction coefficients on the basis of the first control rule and the matrix Tpm. These coefficients are then used to calculate the second control rule.

In this embodiment, two phases repeated in a loop can be distinguished: a first phase aiming to evaluate, at a time t, the impact on the attitudes of the equipment, of each error, assumed to be constant, of the gyroscope for a past horizon [t−ΔT1, t] and, assuming that these errors are constant for the horizon to come [t−ΔT1,t], establish the precession commands that allow the errors in attitudes at the time t+ΔT2 to be cancelled out.

The impact of the errors of the gyroscope on the attitudes of the carrier in the platform coordinate system over the period [t−ΔT1, t] is quantified, for each error of the gyroscope, by these correction coefficients.

The correction coefficients comprise first coefficients representative of the impact, on the errors in attitude in the platform coordinate system, of a measurement error of each rate gyro proportional to the control of precession, called scale-factor error here, that occurred during the first period.

The first coefficients associated with the scale-factor error $k_i$ of the vibrating structure gyroscope having the index i are grouped together in a three-dimensional vector, noted as $[Ck_i(t, t-\Delta T1]_p$.

Each component of the vector of correction coefficients $[Ck_i(t, t-\Delta T1]_p$ represents the error in attitude along each axis of the platform coordinate system p, as is recalled by the index p of the expression, induced by a scale factor unit error $k^i$ of the gyro i that occurred during the first period. The vectors of first coefficients $[Ck_i(t, t-\Delta T1]_p$ of each of the 3 rate gyros 1, 2 and 3 can be calculated according to the following formula:

$$[Ck_1(t, t-\Delta T1]_p = \int_{t-\Delta T1}^{t} T_{pm}(\tau) \cdot \begin{bmatrix} Cp_1(\tau) \\ 0 \\ 0 \end{bmatrix}_m \cdot d\tau$$

$$[Ck_2(t, t-\Delta T1]_p = \int_{t-\Delta T1}^{t} T_{pm}(\tau) \cdot \begin{bmatrix} 0 \\ Cp_2(\tau) \\ 0 \end{bmatrix}_m \cdot d\tau$$

$$[Ck_3(t, t-\Delta T1]_p = \int_{t-\Delta T1}^{t} T_{pm}(\tau) \cdot \begin{bmatrix} 0 \\ 0 \\ Cp_3(\tau)0 \end{bmatrix}_m \cdot d\tau$$

Where:
  $T_{pm}(\ )$ is the matrix for transition from the measurement coordinate system [m] to the geographic coordinate system [p], calculated at the reference time τ,
  $Cp_i$ is the first control rule representative of the first control signal generated during the first period corresponding to the interval [t−ΔT1, t], associated with the gyroscope having the index i.

Optionally, the correction coefficients associated with a gyroscope having the index i comprise second coefficients representative of the impact on the errors in attitude, in the platform coordinate system, of a measurement error of each rate gyro i proportional to the cosine of the electrical angle, called cosine harmonic drift error here.

The second coefficients associated with the gyroscope having the index i can be grouped together in the form of a three-dimensional vector, noted as $[C\cos_i(t, t-\Delta T1]_p$. Each component of the vector of correction coefficients $[C\cos_i(t, t-\Delta T1]_p$ represents the error in attitude along each axis of the platform coordinate system p, as is recalled by the index p of the expression, induced by a drift unit error proportional to the cosine of the electrical angle of the gyro i that occurred during the first period.

The second coefficients $[C \cos_i(t, t-\Delta T1]_p$ of each of the 3 rate gyros 1, 2 and 3 can be calculated in the following way:

$$[C\cos_1(t, t-\Delta T1]_p = \int_{t-\Delta T1}^{t} T_{pm}(\ ) \cdot \begin{bmatrix} \cos\left(2\left(\theta_{e1}(t) + \int_{t-\Delta T1}^{\tau} Cp_1(\tau) \cdot d\tau\right)\right) \\ 0 \\ 0 \end{bmatrix}_m d\tau$$

$$[C\cos_2(t, t-\Delta T1]_p = \int_{t-\Delta T1}^{t} T_{pm}(\ ) \cdot \begin{bmatrix} 0 \\ \cos\left(2\left(\theta_{e2}(t) + \int_{t-\Delta T1}^{\tau} Cp_2(\tau) \cdot d\tau\right)\right) \\ 0 \end{bmatrix}_m d\tau$$

$$[C\cos_3(t, t-\Delta T1]_p = \int_{t-\Delta T1}^{t} T_{pm}(\ ) \cdot \begin{bmatrix} 0 \\ 0 \\ \cos\left(2\left(\theta_{e3}(t) + \int_{t-\Delta T1}^{\tau} Cp_3(\tau) \cdot d\tau\right)\right) 0 \end{bmatrix}_m d\tau$$

where $\theta_{ei}$ designates the electrical angle measured by the sensor 5 of the gyroscope i.

Optionally, the correction coefficients associated with a gyroscope having the index i further comprise third coefficients representative of the impact, on the errors in attitude in the platform coordinate system, of a measurement error of each rate gyro i proportional to the sine of the electrical angle, called sine harmonic drift error here, that occurred during the first period. The third coefficients associated with the gyroscope having the index i can be grouped together in the form of a three-dimensional vector, noted as $[C \sin_i(t, t-\Delta T1]_p$.

Each component of the vector of correction coefficients $[C \sin_i(t, t-\Delta T1]_p$ represents the error in attitude along each axis of the platform coordinate system p, as is recalled by the index p of the expression, induced by a drift unit error proportional to the electrical angle of the gyro i that occurred during the first period. The third coefficients $[C \sin_i(t, t-\Delta T1]_p$ of each of the 3 rate gyros 1, 2 and 3 can be calculated as follows:

$$[C\sin_1(t, t-\Delta T1]_p = \int_{t-\Delta T1}^{t} T_{pm}(\ ) \begin{bmatrix} \sin\left(2\left(\theta_{e1}(t) + \int_{t-\Delta T1}^{\tau} Cp_1(\tau) \cdot d\tau\right)\right) \\ 0 \\ 0 \end{bmatrix}_m d\tau$$

$$[C\sin_2(t, t-\Delta T1]_p = \int_{t-\Delta T1}^{t} T_{pm}(\ ) \begin{bmatrix} 0 \\ \sin\left(2\left(\theta_{e2}(t) + \int_{t-\Delta T1}^{\tau} Cp_2(\tau) \cdot d\tau\right)\right) 0 \\ 0 \end{bmatrix}_m d\tau$$

$$[C\sin_3(t, t-\Delta T1]_p = \int_{t-\Delta T1}^{t} T_{pm}(\ ) \begin{bmatrix} 0 \\ 0 \\ \sin\left(2\left(\theta_{e3}(t) + \int_{t-\Delta T1}^{\tau} Cp_3(\tau) \cdot d\tau\right)\right) 0 \end{bmatrix}_m d\tau$$

In this specific embodiment, the second control rule to be generated during the second period to come to come $[t, t+\Delta T2]$ is chosen in such a way that the correction coefficients calculated over the first period $[t, t-\Delta T1]$ and estimations of correction coefficients to come over the period $[t, t+\Delta T2]$ compensate for each other.

The compensation for the correction coefficients translates into the following equalities:

$[Ck_i(t,t-\Delta T1)]_p + [\hat{C}k_i(t,t+\Delta T2)]_p = 0$ $[C\sin_i(t,t-\Delta T1)]_p + [\hat{C}\sin_i(t,t+\Delta T2)]_p = 0$ $[C\cos_i(t,t-\Delta T1)]_p + [\hat{C}\cos_i(t,t+\Delta T2)]_p = 0$ In these three equalities, the terms with a hat designate respective estimates of the vectors of first, second and third correction coefficients to come over the second period $[t, t+\Delta T2]$, expressed in the platform coordinate system.

These three equalities directly express the desired goal of cancelling out the accumulated average of the errors of the gyroscope, expressed in the platform coordinate system, over the interval $[t-\Delta T1, t+\Delta T2]$ covering the first period and the second period.

As indicated above, at the reference time t, the correction coefficients over the period $[t, t+\Delta T2]$ are obviously unknown since the movement of the carrier to come is not known.

Advantageously, the hypothesis that the transition matrix Tpm over the period $[t, t+\Delta T2]$ is constant and equal to the matrix Tpm at the time t can be made.

The calculation unit 7 of the control device 6 thus determines the second rule for controlling precession for each of the rate gyros (Cpi, for i=1 to 3) that satisfies, for each rate gyro, a system of nine following scalar equations (written here for the rate gyro having the index i=1):

$[Ck_1(t,t-\Delta T_1)]_1 + T_{pm11}(t) \cdot \int_t^{t+\Delta T2} Cp_1(\tau) d\tau = 0$ (1)

$[Ck_1(t,t-\Delta T_1)]_2 + T_{pm21}(t) \cdot \int_t^{t+\Delta T2} Cp_1(\tau) d\tau = 0$ (2)

$[Ck_1(t,t-\Delta T_1)]_3 + T_{pm31}(t) \cdot \int_t^{t+\Delta T2} Cp_1(\tau) d\tau = 0$ (3)

$[C \cos_1(t,t-\Delta T_1)]_1 + T_{pm11}(t) \cdot \int_t^{t+\Delta T2} \cos(2(\theta_{e1}(t) + \int_t^{t+\Delta T2} Cp_1(\tau) \cdot d\tau) d\tau = 0$ (4)

$[C \cos_1(t,t-\Delta T_1)]_2 + T_{pm21}(t) \cdot \int_t^{t+\Delta T2} \cos(2(\theta_{e1}(t) + \int_t^{t+\Delta T2} Cp_1(\tau) \cdot d\tau) d\tau = 0$ (5)

$[C \cos_1(t,t-\Delta T_1)]_3 + T_{pm31}(t) \cdot \int_t^{t+\Delta T2} \cos(2(\theta_{e1}(t) + \int_t^{t+\Delta T2} Cp_{13}(\tau) \cdot d\tau) d\tau = 0$ (6)

$[C \sin_1(t,t-\Delta T_1)]_1 + T_{pm11}(t) \cdot \int_t^{t+\Delta T2} \sin(2(\theta_{e1}(t) + \int_t^{t+\Delta T2} Cp_1(\tau) \cdot d\tau) d\tau = 0$ (7)

$[C \sin_1(t,t-\Delta T_1)]_2 + T_{pm21}(t) \cdot \int_t^{t+\Delta T2t} \sin(2(\theta_{e1}(t) + \int_t^{t+\Delta T2t} Cp_1(\tau) \cdot d\tau) d\tau = 0$ (8)

$[C \sin_1(t,t-\Delta T_1)]_3 + T_{pm31}(t) \cdot \int_t^{t+\Delta T2} \sin(2(\theta_{e1}(t) + \int_t^{t+\Delta T2} Cp_1(\tau) \cdot d\tau) d\tau = 0$ (9)

With $[Ck_1(t, t-\Delta T_1)]_i$: the component according to the component n° i of the correction-coefficient vector $[Ck_1(t, t-\Delta T_1)]_p$ $[C \cos_1(t, t-\Delta T_1)]_i$: the component according to the component n° i of the correction-coefficient vector d $[C \cos_1(t, t-\Delta T_1)]_p$ $[C \sin_1(t, t-\Delta T_1)]_i$: the component according to the component n° i of the correction-coefficient vector $[C \sin_1(t, t-\Delta T_1)]_p$ The systems of equations associated with the rate gyros 2 and 3 are identical if the index 1 is replaced with the indices 2 and 3.

To simplify the calculations carried out by the calculation unit 7, the form of the second control rule (and thus of the second signal resulting therefrom) can be limited.

For example, the second control rule can be limited to a parameterized function, two parameters of which are times of inversion of direction of rotation tinv1 and tinv2. Solving the equation system above means calculating these two inversion times starting from the reference time t.

Figure 5:
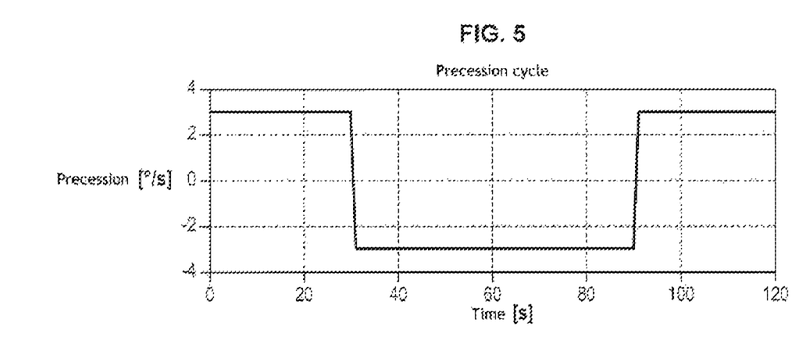
FIG. 5 shows a rule for controlling precession according to an embodiment of the invention.

The second control rule can in particular have a rectangular shape, as illustrated in FIG. 5. The second control rule is therefore equal to +CP from t to tinv1, −CP from tinv1 to tinv2, +CP from tinv2 to t+ΔT.

This type of rule is simple to calculate since it is only dependent on three parameters (CP, tinv1 and tinv2), the value of these three parameters being determined by solving the system of equations.

Figure 6:
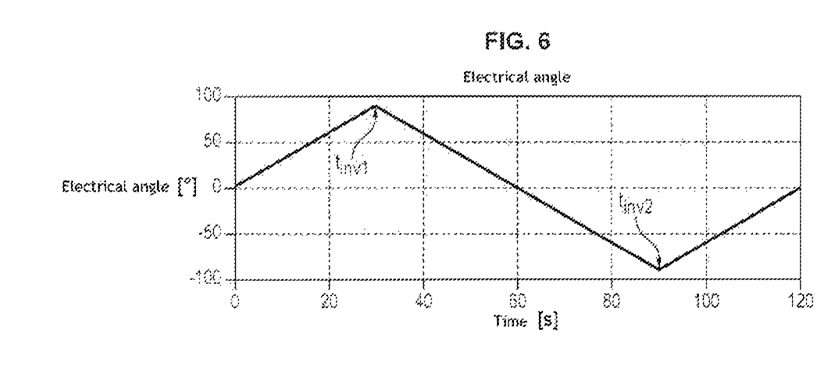
FIG. 6 is a curve of change in electrical angle corresponding to the control rule of FIG. 5.

FIG. 6 shows the change in the electrical angle theoretically measured by the sensor 5 while the precession control signal resulting from the rule shown in FIG. 5 having the shape of stresses the resonator 3.

The system of equations (1) to (9) disclosed above can be solved using a plurality of methods.

According to a first alternative, the system is solved directly by ignoring equations (4) to (9) of the system. In this case, the harmonic derivatives are ignored, and there is no need to involve the electrical angle in the calculations of the control rule. The control device 6 does not therefore need to use data on electrical angle acquired by the sensor 5. Moreover, the calculations carried out by the control device 6 are thus relatively simple while allowing an appealing correction of the angular measurements provided by the gyroscope.

According to a second alternative, the set of the nine equations is solved by minimizing a criterion according to a gradient method ("fmincon" algorithm, with a solving algorithm called "interior-point"). This second alternative has the advantage of more precisely correcting the angular errors induced by the gyroscope in the geographic coordinate system.

The invention is not limited to the embodiments described above in relation to the appended drawings.

For example, in the embodiment shown in FIG. 1, the control device 6 forms a calculation device independent of the gyroscopes used in association with the inertial measurement unit. Alternatively, the control device 6 can be, entirely or part, integrated into each gyroscope.

Moreover, other shapes more complex than a rectangular shape can be chosen for the control rules (for example sinusoidal, triangular, periodic shapes, etc.).

The invention claimed is:

1. A method for controlling the precession of a vibrating structure gyroscope comprising a support and a resonator, the support being mobile in a platform coordinate system and stationary in a measurement coordinate system, the method comprising the generation of a first control signal suitable for rotating a vibration of the resonator with respect to the support in two opposite directions of rotation during a first period, wherein:

reception of data on relative positioning between the measurement coordinate system and the platform coordinate system, comprising a matrix for transition from the measurement coordinate system to the platform coordinate system, calculated at a reference time, calculation of a second control signal to be generated during a second period on the basis of the first control signal and the relative-positioning data, the second control signal being chosen in such a way as to minimize an average of accumulated angular errors in the angular measurements acquired by the vibrating structure gyroscope during the entirety of the first and second period, the angular errors being expressed in the platform coordinate system, the second precession signal being calculated under the hypothesis that the relative-positioning data is fixed from the reference time throughout the entire second period and under the hypothesis that said angular errors are constant throughout the entire second period.

2. The method according to claim 1, wherein the data on relative positioning during the first period is calculated by an inertial measurement unit using angular measurements previously provided by the vibrating structure gyroscope.

3. The method according to claim 1, wherein the calculation of the second control signal comprises the calculation of two times of change in direction of rotation during the second period.

4. The method according to claim 3, wherein the two times of change in direction of rotation are calculated using an interior point method.

5. The method according to claim 4, wherein the second control signal is a rectangular precession signal.

6. The method according to claim 1, wherein the first period and the second period have identical durations.

7. The method according to claim 1, comprising a calculation of at least one first correction coefficient representative of a scale-factor error that occurred during the first period, on the basis of the first control signal and the relative-positioning data, the second control signal being dependent on the first correction coefficient.

8. The method according to claim 7, comprising a calculation of at least one second correction coefficient representative of a harmonic drift of the second order, the second control signal being dependent on the second correction coefficient.

9. A non-transitory computer readable medium comprising program-code instructions for executing the steps of the method according to claim 1, when this program is executed by a control device.

10. A device for controlling precession for a vibrating structure gyroscope comprising a support mobile in a platform coordinate system and stationary in a measurement coordinate system, and a resonator mobile with respect to the support, the control device comprising:

a generator configured to generate a first control signal suitable for rotating a vibration of the resonator with respect to the support in two opposite directions of rotation during a first period, wherein the control device comprises:

an input for receiving data on relative positioning between the measurement coordinate system and the platform coordinate system, comprising a matrix for transition from the measurement coordinate system to the platform coordinate system, calculated at a reference time, a calculation unit configured to calculate, on the basis of the first control signal generated by the generator and the positioning data received via the input, a second control signal to be generated during a second period, the second control signal being chosen in such a way as to minimize an average of accumulated angular errors in angular measurements acquired by the gyroscope during the entirety of the first and second period, the angular errors being expressed in the platform coordinate system, the second precession signal being calculated under the hypothesis that the relative-positioning data is fixed from the reference time throughout the entire second period and under the hypothesis that said angular errors are constant throughout the entire second period.

11. A vibrating structure gyroscope comprising a support, a resonator mobile with respect to the support, and a control device according to claim 10.

12. A system comprising at least one vibrating structure gyroscope according to claim 11, and an inertial measurement unit comprising a unit for processing data, configured to produce the relative-positioning data from angular measurements provided by the or each vibrating structure gyroscope.

\* \* \* \* \*